Patented Nov. 5, 1929

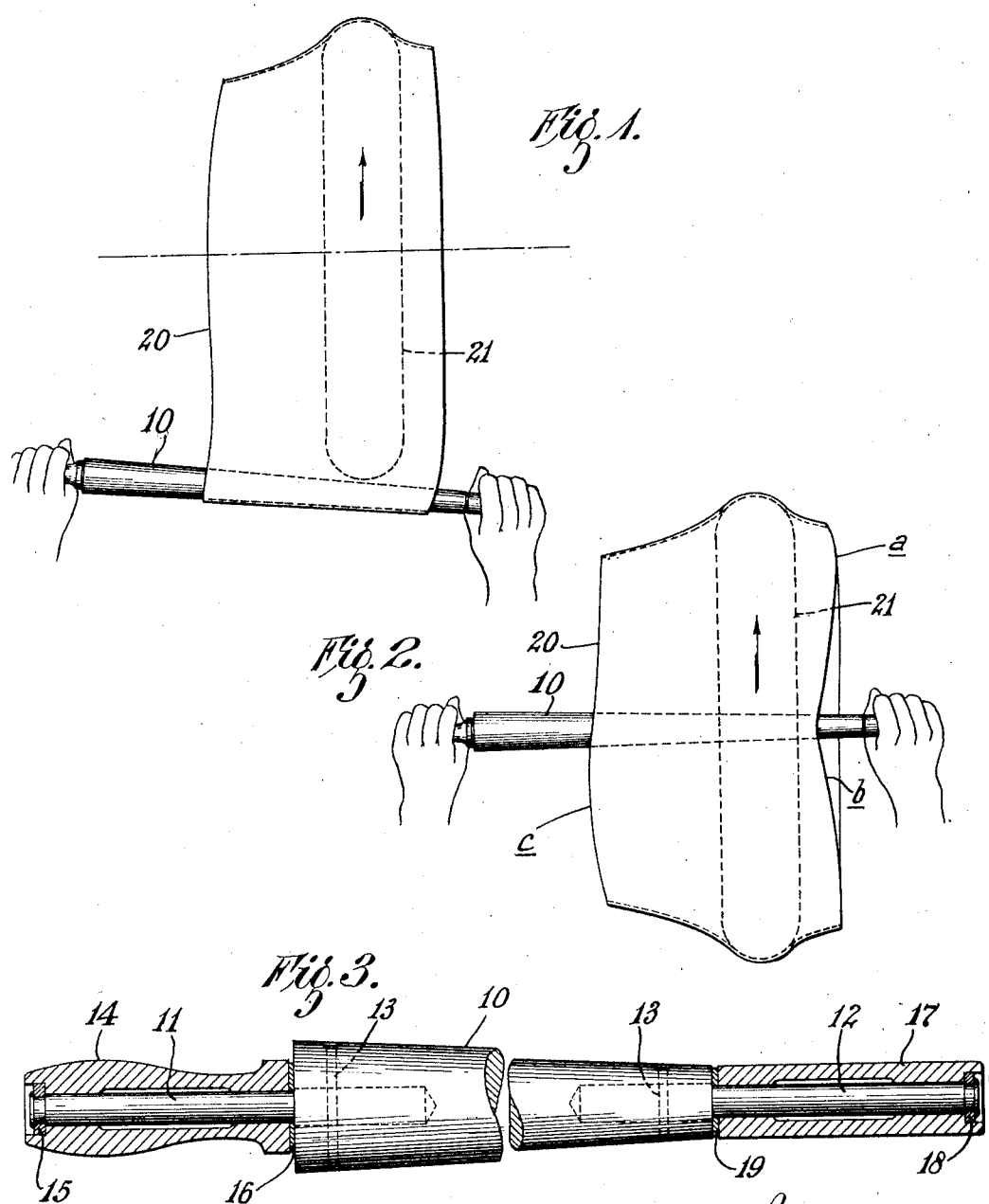

1,734,337

UNITED STATES PATENT OFFICE

CHRISTIAN J. MERZ, OF AKRON, OHIO, ASSIGNOR TO THE B. F. GOODRICH COMPANY, OF NEW YORK, N. Y., A CORPORATION OF NEW YORK

TIRE-BUILDING TOOL

Application filed April 19, 1928. Serial No. 271,182.

This invention relates to tire-building tools and especially to a tool for mounting endless bands of rubberized tire-forming fabric upon the rotatable core of a tire-building machine during the fabrication of a tire casing upon said core.

A tool in common use for the purpose described is shown in the patent to D. L. Williams, No. 1,645,081, issued October 11, 1927, and comprises a pair of rollers journaled upon a pair of parallel rods which are mounted at their ends in respective handle members, one of said rods being pivoted on one handle member and removable from the other handle member so as to permit the rollers to be spread apart for the mounting of a strip of tire-building fabric such as an endless band between them, said rollers closely embracing the strip. The band is centered upon the tire core as the latter is rotated by manipulation of the tool.

Tools of the character described have been found objectionable in that the pivoted rod frequently becomes unlatched from its handle support during use, with resulting danger of injury to the operative. Moreover, wrinkles which frequently form in the fabric band either before or during the band-applying operation sometimes fail to pass between the parallel rollers of the tool with the result that the tool is jerked from the operative's hands or the operator is pulled onto the rotating tire core.

The chief objects of this invention are to provide a tire-building tool which may be used without danger to the operative; which will be light in weight; which because of its peculiar shape may be caused to exert a tentering effect upon the work to prevent the formation of wrinkles therein; and which will be of simple construction and low cost.

Of the accompanying drawings:

Fig. 1 is a plan view of an annular tire band being applied to a tire core by means of my improved tool.

Fig. 2 is an elevation of the same from the near side of Fig. 1.

Fig. 3 is an elevation of my improved tire-building tool, parts being in section and broken away.

Referring to the drawings, particularly Fig. 3, 10 is a tapered roller of light-weight metal such as aluminum, and 11, 12 are axial spindles extending respectively from the large and small ends thereof, said spindles being secured in the roller by pins 13, 13. Journaled upon the spindle 11 is a handle 14 which is held thereon by a washer 15 over which the end of the spindle is peened, and a fibre thrust-washer 16 is mounted upon the spindle between the roller 10 and the handle 14. Journaled upon the spindle 12 is a cylindrical handle 17 of the same diameter as the small end of the roller 10, said handle being held on the spindle by a washer 18 over which the end of the spindle is peened. A fibre thrust-washer 19 is mounted upon the spindle between the roller 10 and the handle 17.

In the operation of the invention an annular band of tire fabric, such as the band 20, Figs. 1 and 2, is started upon a rotatable tire core, such as the core 21, one of the lateral margins of the band being stretched onto the crown of the core throughout at least a part of its circumference. The tire-building tool is then positioned between the core 21 and band 20, the small end of the tool being inserted first. The operator then stands in front of the tire core, and by grasping the handles 14, 17, pulls the tool toward himself until it is clear of the core, after which the latter is caused to rotate in the direction indicated by the arrows.

The operator, while holding the tool at a slight angle to the axis of the core as shown in Fig. 1, but approximately in a common plane with the axis, as shown in Fig. 2, moves the tool toward the right as viewed in Fig. 1, while maintaining its oblique position and holding it away from the core to tension the band, and thereby causes the band 20 to feed laterally onto the tire core, which operation is continued until the band occupies a central position thereon. The rotation of the core is then stopped and the tool removed.

During the operation just described, the band travels smoothly over the roller 10 and no wrinkles are formed in the band, which phenomenon apparently is due to the tapered form of the roller operating in the following manner. The angular position of the roller 10 with relation to the axis of the tire core creates a greater tension in the band 20 along its right marginal portion, which is the leading edge of the band as it is moved onto the tire core, than in the middle zone of the band, so that both the tire core and the roller act with a crown-pulley effect upon the right-hand margin of the band, as indicated by the bays $a$ and $b$ therein, to cause the band to feed to the right onto the core and to cause its right-hand margin to be impelled to climb toward the smaller but most tensioning end of the roller. In other words the right-hand margin of the fabric apparently tries to move laterally toward the small end of the roller, where the tension is greatest because of the inclination of the roller to the core axis, notwithstanding the force urging the margin in the opposite direction because of the backward drag of the roller at its small end due to the relatively slow surface speed of the roller at that end.

The opposite annular margin of the band, which is its trailing margin, is under little or no tension between the roller and that part of the core, at its top, onto which the band is running, because of the oblique position of the roller 10. However, the surface speed of the roller at the left-hand margin of the band, because of the larger diameter of the roller at that position, is greater than the speed of the band, and the consequent forward wiping of the band by the roller imparts relatively high tension to the left-hand margin of the band in the portion thereof approaching the roller, so that the roller acts upon the left-hand margin of the band with a crown-pulley effect, as indicated by the bay $c$ therein (Fig. 2), with the result that the left-hand margin of the band is urged toward the left-hand or larger end of the roller.

The net result of the lateral urging of the marginal portions of the band in opposite directions upon the roller, which it is believed occurs in accordance with the above theory, is a tentering effect which keeps the band free from wrinkles as it is progressively fed onto the tire core.

My invention may be modified within the scope of the appended claims.

I claim:

1. A tire-building tool comprising a tapered roller adapted to be engaged as a guide-roller within an endless band of tire-building material.

2. A tire-building tool comprising a tapered roller and handles at the respective ends thereof and journaled with relation thereto whereby the roller may be held rotatably in engagement as a guide-roller with a band of tire-building material.

In witness whereof I have hereunto set my hand this 16th day of April, 1928.

CHRISTIAN J. MERZ.